United States Patent [19]

Oas

[11] 4,290,995
[45] Sep. 22, 1981

[54] METHOD OF PRODUCING ARTICLES FROM THERMOPLASTIC PARISONS

[75] Inventor: David C. Oas, Lenox, Mass.

[73] Assignee: Beloit Corporation, Beloit, Wis.

[21] Appl. No.: 172,187

[22] Filed: Jul. 25, 1980

Related U.S. Application Data

[62] Division of Ser. No. 38,893, May 14, 1979, Pat. No. 4,251,203.

[51] Int. Cl.³ ............................................. B29C 17/07
[52] U.S. Cl. ................................. 264/532; 264/535; 264/536
[58] Field of Search ............... 264/521, 523, 532, 535, 264/538, 543, 536; 425/526, 529, 531, 534, 537, 538, 532, 522

[56] References Cited

U.S. PATENT DOCUMENTS

| | | | |
|---|---|---|---|
| 3,721,514 | 3/1973 | Harris | 425/534 X |
| 3,850,566 | 11/1974 | Moore | 425/534 X |
| 4,057,609 | 11/1977 | Uhlig | 264/538 X |

*Primary Examiner*—Jan H. Silbaugh
*Attorney, Agent, or Firm*—Hill, Van Santen, Steadman, Chiara & Simpson

[57] ABSTRACT

Parisons are presented at a pickup station related to a plurality of spaced molding stations and a spaced discharge station, so that a plurality of angularly spaced pickup and mold loading devices and a plurality of angularly spaced article transfer devices are operable on a cyclically oscillatable transfer mechanism for orienting the loading devices alternately in a parison pickup position at the pickup station and a mold loading position at the respective molding stations, and for orienting the article transfer devices alternately in an article stripping position at the molding stations and in a discharge position at the discharge station. In each cycle of operation, all of the devices are operated in coordination, and at least one parison is picked up at the pickup station, the at least one previously picked up parison is loaded into one of the molds, another mold is stripped of a molded article, and a previously stripped article is discharged at the discharge station.

11 Claims, 5 Drawing Figures

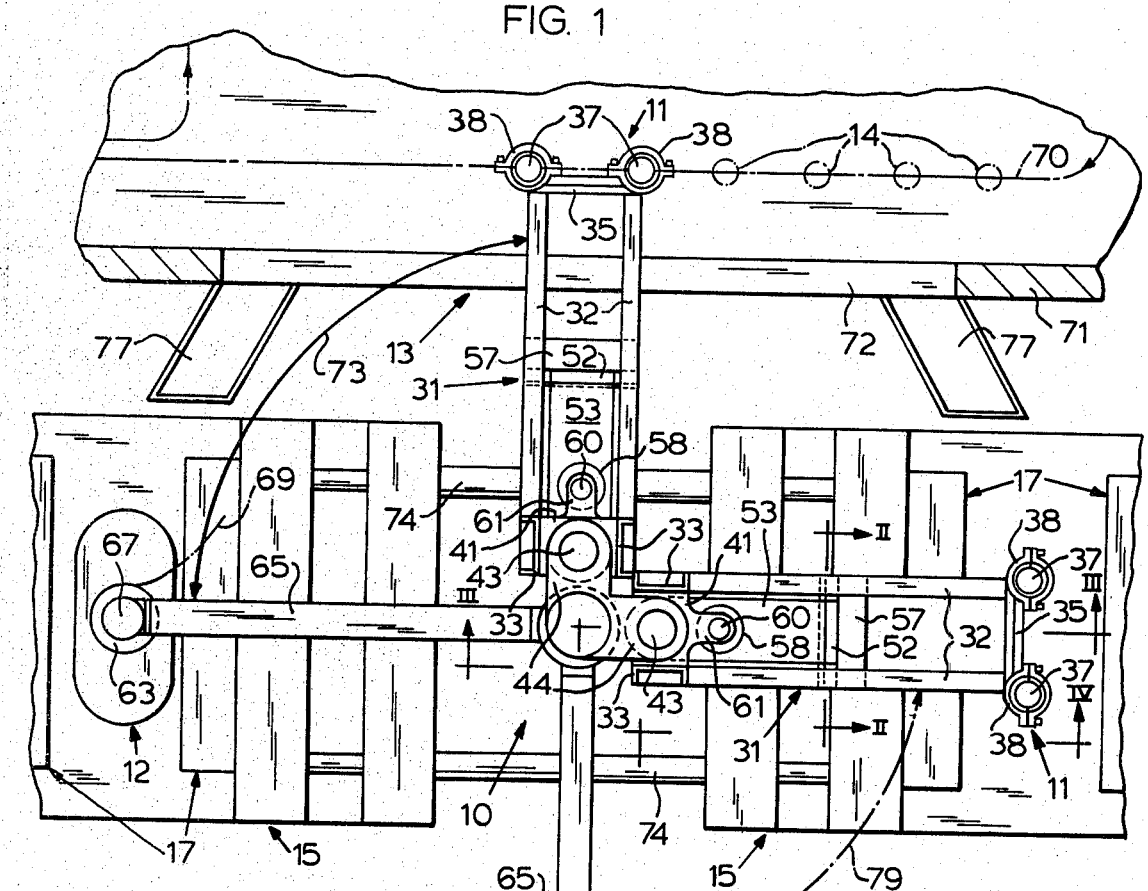
FIG. 1
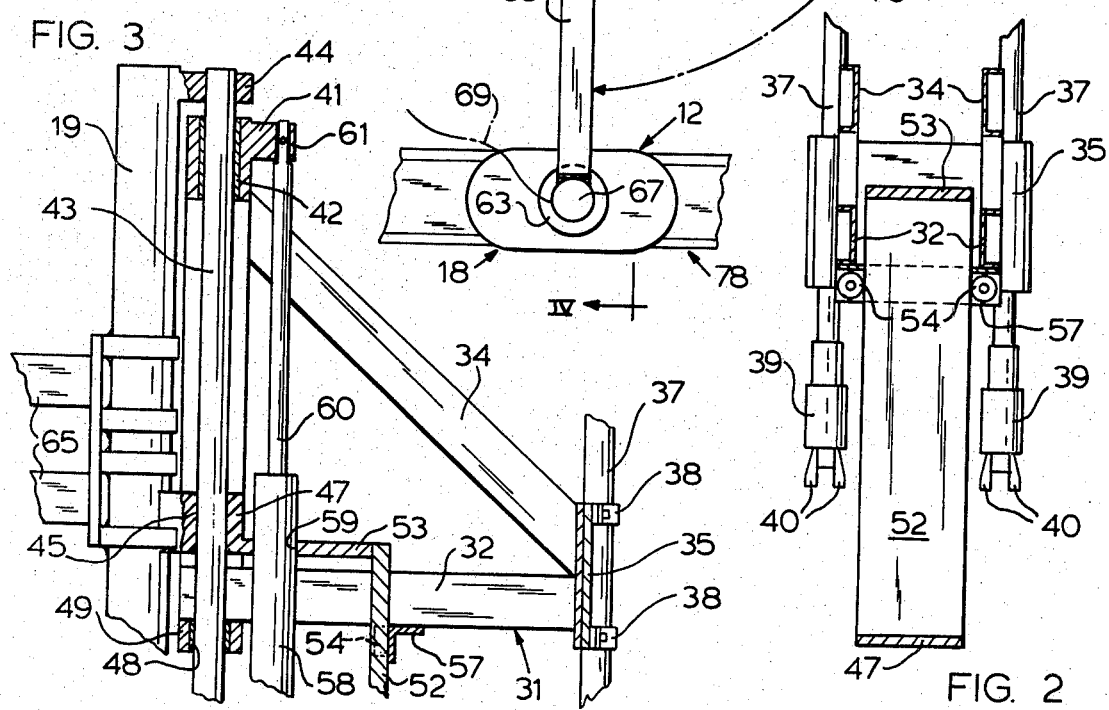
FIG. 3
FIG. 2

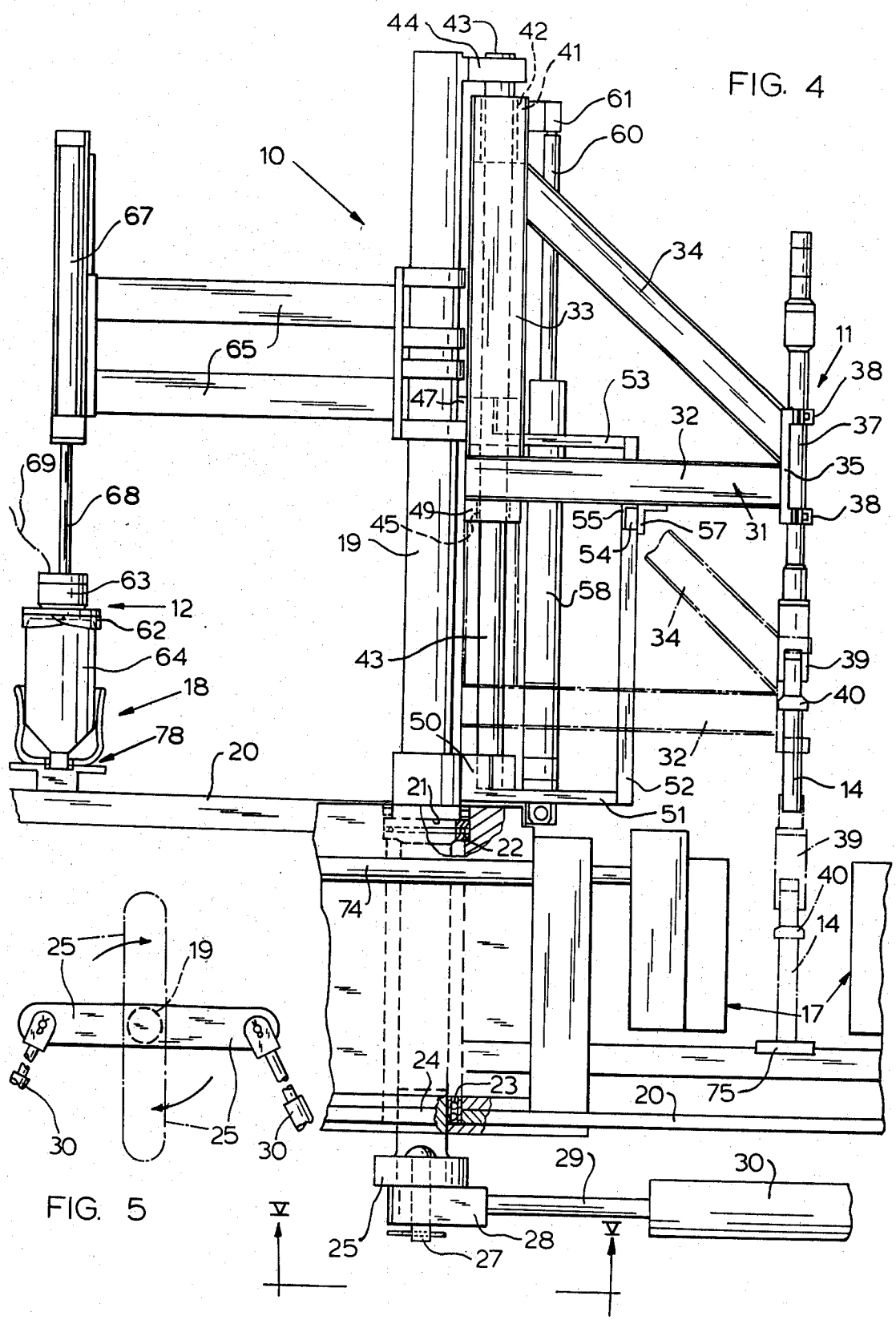

METHOD OF PRODUCING ARTICLES FROM THERMOPLASTIC PARISONS

This is a division of application Ser. No. 038,893, filed May 14, 1979, now U.S. Pat. No. 4,251,203.

BACKGROUND OF THE INVENTION

This invention relates to a new and improved method for producing articles from thermoplastic preforms or parisons, and more particularly relates to picking up and carrying parisons from a pickup station to mold means and then transferring the molded articles from the mold means to a discharge station.

In various known molding techniques, such as vacuum molding, blow molding, or the like, a preform of moldable thermoplastic material, commonly referred to as a parison, is reshaped into a finished article on or within a mold. For blow molding, tubular parisons are provided, and by way of example, the present invention will be described as useful in connection with blow molding, although not intended to be limited thereto.

Although the parisons may be formed by extrusion in a hot state and while still hot be carried to the mold, a widely used procedure comprises cooling the extruded parisons and storing the same for use at a subsequent time. The latter procedure is referred to as a "cold parison" process because it starts with a cold, i.e., room temperature, parison which must be heated to a temperature suitable for molding. Regardless of which procedure is employed, a problem arises in transferring the heated parisons to the mold or molds. By way of example, U.S. Pat. No. 3,566,441 is referred to for an arrangement wherein injection molded parisons are transferred directly from the injection mold to a blow mold. An example of apparatus for transferring reheated or oven heated parisons to blow molds is found in U.S. Pat. No. 4,106,886. Although the first mentioned patent discloses a rotating arm device, and the second mentioned patent discloses a linear transfer device, neither of such patents discloses any molded article stripping and/or transfer means for clearing the mold or molds of molded articles. In other words, the disclosed apparatus of the identified patents are designed for the single purpose of transferring parisons from a parison forming mold to a blow mold and then a repeat of that operation. Some other not disclosed means, in no way directly associated with the parison transfer and blow mold loading means must be employed.

Even though the art of molding articles from thermoplastic parisons has, as represented by the foregoing patents, attained a considerable state of development, there nevertheless remains the desirability of increasing the production rate without increased cost, utilizing the heating oven to greater advantage by more rapid transfer of heated parisons to the molds. It is also desirable to attain more rapid transfer from oven to blow molds and transfer of articles from the blow molds, rapidly and with minimum dwell intervals.

SUMMARY OF THE INVENTION

It is, therefore, an important object of the present invention to provide a new and improved method for producing articles from thermoplastic parisons, and which will combine in each operating cycle, not only transfer of parisons from a pickup station such as an injection mold or oven to an article mold, but also to effect coordinated stripping of a previously loaded mold and discharge of finished article or articles therefrom.

The invention provides a method for producing articles from thermoplastic parisons, comprising cyclically oscillating a transfer mechanism operating about a vertical axis and carrying a plurality of at least two angularly spaced parison pickup and mold loading devices and a plurality of at least two angularly spaced molded article transfer devices, presenting successive parisons at a pickup station within reach of said pickup and loading devices, providing a plurality of molding stations spaced from said pickup station and within reach of said pickup and loading devices and said transfer devices, and each of said molding stations having mold means adapted for receiving and molding the parisons into articles, providing an article discharge station spaced from said molding stations and from said pickup stations and within reach of said transfer devices, in the cyclical oscillations of said transfer mechanism orienting said pickup and loading devices alternately in a parison pickup position at said pickup station and in a mold means loading position at said molding stations, and in each of said cyclical oscillations, orienting said article transfer devices alternately in a mold stripping position at said molding stations and in a discharge position at said discharge station, and coordinating operation of said pickup and loading devices and said article transfer devices in said positions at said stations in each cyclical oscillation of said transfer mechanism and effecting pickup of at least one parison by one of said pickup and loading devices at said pickup station, loading at least one parison at one of said molding stations into one of said molds from another of said pickup and loading devices, stripping a molded article from another of said molds by action of one of said article transfer devices, and discharging a previously stripped article from another of said article transfer devices at said discharge station.

BRIEF DESCRIPTION OF THE DRAWINGS

Other objects, features and advantages of the invention will be readily apparent from the following description of a certain representative embodiment thereof, taken in conjunction with the accompanying drawings although variations and modifications may be effected without departing from the spirit and scope of the novel concepts embodied in the disclosure and in which:

FIG. 1 is a schematic plan view of apparatus embodying the invention;

FIG. 2 is an enlarged fragmentary vertical sectional and elevational detail view taken substantially along the line II—II of FIG. 1;

FIG. 3 is a fragmentary vertical sectional elevational view taken substantially along the line III—III of FIG. 1;

FIG. 4 is a vertical elevational view taken substantially along the angular line IV—IV in FIG. 1; and FIG. 5 is a fragmentary smaller scale bottom plan view taken substantially along the line V—V in FIG. 4.

On reference to FIG. 1, apparatus for producing articles from thermoplastic parisons, comprises transfer mechanism 10 which is cyclically oscillatable about a vertical axis and carries a plurality of at least two angularly spaced parison pickup and mold loading devices 11 and a plurality of at least two angularly spaced molded article transfer devices 12. A pickup station 13 is located within reach of the pickup and loading devices 11 for presenting successive parisons 14 to the pickup and loading devices. A plurality of molding stations 15 are spaced from the pickup station 13 and within reach of the pickup and loading devices 11 and the transfer devices 12, and each of the molding stations 15 has mold means 17 adapted for receiving and molding the parisons into articles. An article discharge station 18 is spaced from the molding stations and from the pickup station and is within reach of the transfer devices 12.

In a desirable arrangement, the transfer mechanism 10 comprises a rugged vertical shaft 19 which is freely pivotally mounted on a supporting frame 20 which may be common to the molding stations 15 and the discharge station 18. Intermediate its height, the shaft 19 has a downwardly facing annular thrust shoulder 21 supported on an annular thrust bearing 22. Adjacent to its lower end, the shaft 19 is desirably stabilized through an annular collar bearing 23 fitted about an annular portion 24 of the shaft. On its lower end, below the bearing 23, the shaft 19 has means for cyclically oscillating the shaft and thereby the transfer mechanism 10, herein comprising a pair of diametrically oppositely extending arms 25 to which are pivotally connected as by means of respective pivot pins 27 respective heads 28 on the outer ends of respective driving piston rods 29 of associated rectilinear fluid operated actuators 30, there being one of the actuators 30 for each of the arms 25. The actuators 30 are fixedly mounted as for example on the frame 20 in a generally convergent relation so that by coordinated operation of the actuators 30, the arms 25, and thereby the shaft 19 will be oscillated through a 90° range as indicated by the full line and dash line illustration in FIG. 5. Thereby in each 90° oscillation of the transfer mechanism 10, the pickup and loading devices 11 are alternately oriented in a parison pickup position at the pickup station and in a mold loading position at the molding stations, and the article transfer devices 12 are oriented alternately in a mold stripping position at the molding stations and in a discharge position at the discharge station.

In a preferred arrangement, each of the parison pickup and mold loading devices comprises an arm structure 31 extending radially from the vertical shaft 19 and provided with a pair of spaced parallel coextensive horizontal beams 32 rigidly attached at their inner ends adjacent to the shaft 19 to the lower ends of vertical beams 33 which extend upwardly and have rigidly attached thereto the upper ends of diagonal brace beams 34 which have their lower ends rigidly connected to the outer ends of the beams 32 by means of a vertical head plate 35 adapted to support in this instance a pair of spaced parallel vertical coextensive hollow picker shafts 37 which may be secured to the plate 35 as by means of clamps 38 by which accurate vertical adjustments of the shafts 37 can be effected for optimum functioning of respective pickers 39 carried by the lower ends of the shafts 37 and adapted to be operated by suitable actuating means carried by the shafts 37 for operating picker jaws 40 as required. Construction and operation of the pickers 39 may be as disclosed in the aforesaid U.S. Pat. No. 4,106,886 which to any extent necessary is incorporated herein by reference. It is sufficient to state here that the picker jaws 40 are operable to grip the upper end of a respective one of the parisons 14 at the pickup station 13 and transport the same to the molding station 15 to which the respective pickup and mold loading device 11 is adapted to be oriented. As will be apparent in FIG. 1, the devices 11 are supported by their arms 31 in 90° relation to one another so that in one cyclically oscillated position of the transfer mechanism 10, one of the devices 11 will be in pickup position at the pickup station 13 and the other of the devices 11 will be in mold loading position at one of the molding stations 15, while in the opposite cyclically oscillated position of the transfer mechanism 10, the device 11 which was at the pickup station, will be oriented in mold loading position at the other of the molding stations 15 and the device 11 which was at the associated molding station will be oriented at the pickup station 13.

Both at the pickup station 13 and at the molding stations 15, the pickers 39 must be vertically shiftable. To this end, the supporting arms 31 are mounted for vertical adjustment relative to the vertical shaft 19, and since the vertical adjustment at each of such stations may require independent although coordinated action of the pickers, each of the arms 31 is mounted for independent vertical adjustment. Herein, the mechanism for accomplishing such adjustment may be identical for each of the arms and therefore a description in respect to one of the arms will also apply to the other of the arms 31. Between the upper end portions of the vertical beams 33 of the frame of each of the arms 31 is a fixed bearing block 41 (FIGS. 3 and 4) carrying a bushing bearing 42 through which extends slidably the upper end portion of a vertical guide shaft 43 which has its upper end attached to a cantilever supporting boss 44 rigid with the upper end of the main vertical shaft 19. From the boss 44, the shaft 43 extends downwardly not only through the bearing 42, but also through a stabilizing bore 45 in a bracket block 47 rigid with the shaft 19 at an elevation slightly above the highest elevation to which the arm frame beams 32 rise in the uppermost position at the arm 31. Additional guide for the arm 31 is provided by bearing bushing 48 carried by a cross bar rigid on and between the lower sides of the inner end portions of the arm frame beams 32. At its lower end, the guide shaft 43 is supported fixedly in a block 50 rigid with the main shaft 19 adjacently above the thrust shoulder 21. Additional stabilizing guide means for the arm 31 comprise a frame having a lower arm 51 projecting outwardly from the block 50 and rigidly connected to a vertical frame bar 52 extending upwardly between the arm lower frame beams 32 and rigid with an upper horizontal arm 53 which extends rigidly outwardly from the bearing bracket or block 47. Vertical side edges of the frame bar 52 serve as tracks for antifriction guide rollers 54 (FIG. 2) mounted on and between respective trunnion brackets 55 and a stabilizing cross bar 57 rigid with the undersides of the arm beams 32.

Vertical reciprocal adjustments of the arm 31, and thereby the pickers 39, is effected by means of a fluid operated rectilinear vertically extending cylinder and piston actuator 58 which has its cylinder attached at its lower end to the frame arm 51 and with the upper end portion of the cylinder extending up through an aperture 59 in the upper frame arm 53. Projecting upwardly from the actuator cylinder is a vertically reciprocable piston rod 60 which extends upwardly between the arm beams 34 and has its upper end fixedly attached to a bracket boss 61 projecting rigidly outwardly from the bearing block 41. The relative lengths of the cylinder and piston rod of the actuator 58 are such that the arm 31 can be reciprocated throughout a substantial vertical range, the upper limit of which as shown in full outline in FIG. 4 enabling efficient transporting of the picked up parisons 14, and a fully lowered position as shown in broken outline for loading the parisons in the mold 17 with which oriented.

Each of the transfer devices 12 comprises clamp jaw structure 62 (FIG. 4) carried by a fluid operated actuator head 63 and adapted to engage the molded articles 64 to be stripped from the molds 17 and discharged at the discharge station 18. Where, as shown, the molded articles 64 are blown bottles, the clamp structures 62 are designed to clamp the upended bottom portions of the articles.

As best seen in FIG. 1, there are two of the transfer devices 12 located 90° spaced from one another and each 90° from the adjacent one of the pickup and loading devices 11. Each of the devices 12 is, in effect, companion to the adjacent device 11 to function in respect to the same molding station 15 as its companion.

Each of the transfer devices 12 has a supporting arm structure comprising coextensive adjacently vertically spaced arm beams 65 which extend rigidly radially outwardly from the main oscillating shaft 19. One of the arm assemblies 65 extends in the same plane as but in the opposite direction from one of the arms 31, and the other of the arm assemblies 65 extends in the same plane as but in the opposite direction from the other of the arms 31. At the outer end of each of the arm assemblies 65 is rigidly mounted a vertically extending cylinder 67 of a fluid operated actuator from the lower end of which extends a vertically reciprocable piston rod 68 to the lower end of which is fixedly attached the associated article stripping clamping jaw head 63. Each of the heads 63 and associate actuator 67, 68 is independently operable from a suitably controlled pressure fluid source. For example, a pressure fluid duct 69 is represented schematically for each of the respective heads 63.

It will be understood that all of the several actuating means of the transfer mechanism 10 are adapted for coordinated operation of the pickup and loading devices 11 and the article transfer devices 12 in the several positions at the several operating stations. In each oscillation cycle of the transfer mechanism, at least one, and in the present instance two parisons are picked up from the pickup station 13 and at least one parison, in this instance two, are loaded into one of the molds 17, the molded articles are stripped from another of the molds 17 and the previously stripped articles are discharged at the discharge station 18. All of these functions are, of course, adapted to be effected automatically by means of any preferred cyclical operating system, which may utilize well-known pneumatic and/or hydraulic circuitry and control valves, electrical circuitry with control, limit and safety switches, timers, etc., and which may readily be designed by competent technicians in this field of endeavor. Instead of fluid operated actuators, i.e., pneumatic or hydraulic as may be preferred, mechanical actuating mechanism may be employed where desired and feasible. Fluid operated actuators generally offer smoother, simpler and more accurately controllable operation. At least supplemental manual controls may also be provided as is customary.

Although it is believed that from the foregoing, it will be reasonably apparent how the mechanism 10 functions cyclically, a summary of operation may be helpful. In each cycle of operation, the vertical main shaft 19 is oscillated 90° from a position in which one of the pickup and mold loading devices 11 is in position at the pickup station 13 and the other of the devices 11 is in position at one of the molding stations 15, while at the same time, one of the article transfer devices is in position at the other of the molding stations 15 and the other of the devices 12 is at the discharge station 18. At the beginning of operation, of course, the molds 17 will be empty and it may be necessary to operate the apparatus manually through two oscillation cycles, that is from the position of the transfer mechanism 10 as shown for example in FIG. 1, wherein the pickup and loading device 11 at that time oriented with respect to the pickup station 13 may be operated to pick up a pair of the parisons 14 presented at the pickup station 13 in any suitable manner as for example, by means of a conveyor 70 as schematically shown and which is desirably actuated in timed sequence to present a pair of the parisons 14 for pickup by each of the devices 11 in each cycle of operation of the device 10. The parison conveyor 70 may, as shown, be located within an oven 71 wherein the parisons 14 are heated and maintained heated to the desired degree. Any suitable access opening means 72 may be provided into the oven at the pickup station 13 and which although shown schematically as a relatively wide opening, may comprise simply an opening into the top of the oven where a heat retaining closure may be operated in timed sequence with operation of the pickup and mold loading device 11 oriented in each cycle of operation at the pickup station 13. At the pickup station 13, the arm 31 of the device 11 may be dropped by action of the associated actuator 58, 60, until the open clamps 40 are in position to grip the upper end of the two parisons 14 with which aligned. Then the actuator 58, 60 is operated to raise the arm 31 and the gripped parisons 14 are lifted out of the oven 71. Oscillation of the mechanism 10 is then effected as indicated by the directional arrow 73 to swing the parison carrying device 11 into loading orientation to the left-hand molding station 15 in FIG. 1. At the same time, the other of the devices 11 is swung into pickup orientation to the pickup station 13. Then as the device 11 is operated to load the mold 17 with which oriented, the device 11 now oriented at the pickup station 13 is operated to pick up another pair of the parisons 14 which in the interim have been moved into position at the loading station by timed operation of the conveyor 70. At the molding station 15, the parison carrying device 11 is lowered to position the parisons 14 carried thereby between the open halves of the mold 17. It will be understood that the halves of each of the molds 17 will be provided with the desired complementary halves of the desired molding cavity, and means customary with such molds for heating the same and blowing the parisons, and the like. Any preferred means may be provided for opening and closing the sections of the molds 17, such as fluid actuators 74 which are controlled to coordinate operation of the molds 17 with the operating cycles of the mechanism 10. Desirably the arm 31 of the device 11 which is in the mold loading orientation is adapted to be lowered by the actuator 50,60 until the lower ends of the parisons 14 are received in clamping means 75 (FIG. 4) as is conventional practice. To avoid overrun of the device 11 during descent during load molding, the bearing block 47 may serve as a stop engageable with the opposed block 50. Alternatively or cooperatively with such stop arrangement, the upper bearing block 41 may serve as a stop against a stop shoulder provided by the mounting block 47. After the lower ends of the parisons 14 have been gripped by the clamping means 75, the actuator 58, 60 is operated to raise the device 11 whereby to apply tension to the gripped parisons and thereby stretch the parisons axially as is desirable for biaxial orientation of the molecular structure of the thermoplastic material. Such stretching is effected until the clamps 40 just clear the tops of the mold 17 which is closed in timed sequence and severs the upper extremities of the parisons 14 gripped in the clamps 40 from the body of the parisons within the mold. Elevation of the device 11 from the mold loading position may then continue, and as the device is swung back toward the pickup station 13, the scrap pieces are adapted to be dropped into a suitable receptacle 77 by opening the clamps 40 to discharge the scrap pieces as the device 11 swings over the receptacle on route from the molding station 15 to the pickup station 13.

Also in each cycle of operation, one of the article transfer devices 12 is oriented in mold stripping position at the molding station 15 which has been charged with the parisons 14 by the pickup and mold loading device 11 which has been returned to the pickup station 13. Alternately, the other of the article transfer devices 18 has been swung into position at the discharge station 18. With respect to the device 12, which is at one of the molding stations 15, the associated actuator 67, 68 is operated to move the clamp 62 into engagement with the articles 64 presented thereto by opening of the aligned mold 17, and the clamp actuator 63 is operated to operate the jaw clamp 62 in each instance to grip the engaged end portion of the article 64 then the actuators 67, 68 is operated to raise the jaw clamps 62 and the engaged articles 64 from the open mold 17. While mold stripping action proceeds with respect to the device 17 in the stripping position, the other of the devices 12, now oriented at the discharge station 18 drops the articles 64 therefrom, or, if preferred, deposits the articles 64 in a take away conveyor 78. In either arrangement, the articles 64 are released by opening the jaw clamps 62, the clamps being adapted to be raised to suitable clearance position by operation of the associated actuators 67, 68.

In the next operating cycle of the transfer mechanism 10, the article transfer device 12, which was at the discharge station 18 moves, as indicated by the directional arrow 79, toward stripping position at the molding station 15 wherein parisons have just been loaded by the adjacent one of the devices 11 and which now is returned to the pickup station 13, while the device 11 which has picked up another pair of the parisons 14 is swung to loading position at the other of the molding stations 15 and the device 12 which has now stripped the articles 64 from the mold 17 at such other station is swung into the discharge station 18.

It will thus be apparent that the relatively short 90° swinging movements of the plurality of cooperative pickup and mold loading devices and article transfer devices to and from the respective stations and vertical reciprocations of the devices enables short, rapid operating cycles for maximum production rate. By virtue of the plurality of alternately operable pickup and mold loading devices and correponding plurality of article transfer devices, production rate is correspondingly multiplied within the same time span required for operation of prior apparatus which can produce only half as many articles in comparable space and time span.

It will be understood that variations and modifications may be effected without departing from the spirit and scope of the novel concepts of this invention.

I claim as my invention:

1. A method of producing articles from thermoplastic parisons, comprising:

cyclically oscillating about a vertical axis a mechanism having at least two adjacent but angularly spaced vertically reciprocable combination parison pickup and mold loading devices, and at least two vertically reciprocable molded article transfer devices angularly spaced from each other and from said loading devices;

presenting successive parisons at a pickup station located within reach of said pickup and loading devices;

providing a plurality of molding stations spaced from said pickup station and located within reach of said pickup and loading devices, and each of said molding stations having mold means adapted for receiving and molding the parisons into articles;

providing an article discharge station spaced from said molding stations and from said pickup station and located within reach of said transfer devices;

and operating said mechanism and said devices in a step-by-step cycle comprising, in the following order:

(1) orienting one of said loading devices in a parison pickup position above said pickup station and orienting a second of said loading devices above one of said molding stations, and in coordination therewith orienting one of said transfer devices above a second of said molding stations and orienting a second of said transfer devices above said discharge station;

(2) lowering said loading devices and transfer devices and thereby picking up a parison at said pickup station by means of said one loading device and loading a parison into said one molding station by means of said second loading device, and in coordination therewith entering said one transfer device into molded article stripping relation to said second molding station and discharging a molded article to said discharge station from said second transfer device;

(3) raising said loading and transfer devices above said stations;

(4) turning said mechanism in one direction of oscillation and orienting said one loading device over said second molding station, orienting said second loading device over said pickup station, orienting said one transfer device over said discharge station and orienting said second transfer device over said one molding station;

(5) lowering said loading devices and said transfer devices downwardly and loading a parison into said second molding station from said one loading device, picking up a parison at said pickup station with said second loading device, and in coordinated relation therewith discharging a molded article to said discharge station from said one transfer device and entering said second transfer device into article stripping relation to said one molding station;

(6) raising said loading devices and said transfer devices above said stations; and (7) turning said mechanism in the opposite direction of oscillation and thereby returning said one loading device to said pickup station, returning said second loading device to said one molding station, returning said one transfer device to said second molding station and returning said second transfer device to said discharge station; for repeating the operating cycle.

2. A method according to claim 1, wherein said mechanism comprises an oscillatable mount having four arms radiating thereon at 90° intervals, two adjacent ones of said arms carrying said pickup and mold loading devices, and the remaining two of said arms carrying said article transfer devices, and oscillating said mount 90° both ways in each cycle.

3. A method according to claim 1, wherein said mechanism has radiating angularly spaced arms respectively carrying said pickup and molding devices and said article transfer devices, moving said arms which carry said pickup and molding devices in vertical operational movements, and operating actuators on said transfer device carrying arms and thereby operationally moving article clamping means of said article transfer devices throughout a substantial vertical range.

4. A method according to claim 1, wherein said mechanism comprises angularly spaced arm structures mounting said pickup and molding devices, operating actuators for moving said arms throughout a substantial vertical operational range of movements, and guiding said arms in stabilized manner throughout said vertical range.

5. A method according to claim 4, wherein each of said pickup and mold loading devices includes parison clamping means, and operating actuator means mounted on the associated arms and thereby operating said clamping means.

6. A method according to claim 1, wherein each of said pickup and mold loading devices comprises parison clamping means and each of said article transfer devices comprises article clamping means, and coordinating operation of said clamping means by operating respective actuators.

7. A method according to claim 1, comprising operating a plurality of parison pickers on each of said pickup and mold loading devices.

8. A method according to claim 1, which comprises operating gripping means on said article transfer devices and thereby engaging a plurality of articles simultaneously during molded article stripping from said molds.

9. A method according to claim 1, comprising operating a plurality of parison pickers on each of said pickup and loading devices and thereby picking up and loading a plurality of parisons in each cycle of operation of said mechanism, and in each cycle of operation actuating a plurality of gripping and stripping means of said transfer devices and thereby stripping a plurality of articles from the mold means.

10. A method according to claim 1, comprising oscillatably driving a shaft carrying said devices and thereby effecting cyclical oscillations of the mechanism.

11. A method according to claim 1, heating and presenting said successive parisons at said pickup station in a parison heating oven and on a conveyor in timed sequence with cyclical operations of said mechanism, operating said mold means to close the molds upon being loaded with parisons at one of said molding stations and opening the mold means at the other of said molding stations for stripping of articles therefrom, at each of said mold means stretching said parisons during loading of the mold means, receiving parison scrap from said pickup and mold loading devices as said pickup and mold loading devices respectively return from mold loading position to parison pickup position, and receiving articles from said article transfer devices at said discharge station and taking the discharged articles away from said discharge station.

* * * * *